March 1, 1927.
C. G. OLSON
1,619,483
GEAR TESTING MACHINE
Filed March 30, 1922 5 Sheets-Sheet 4
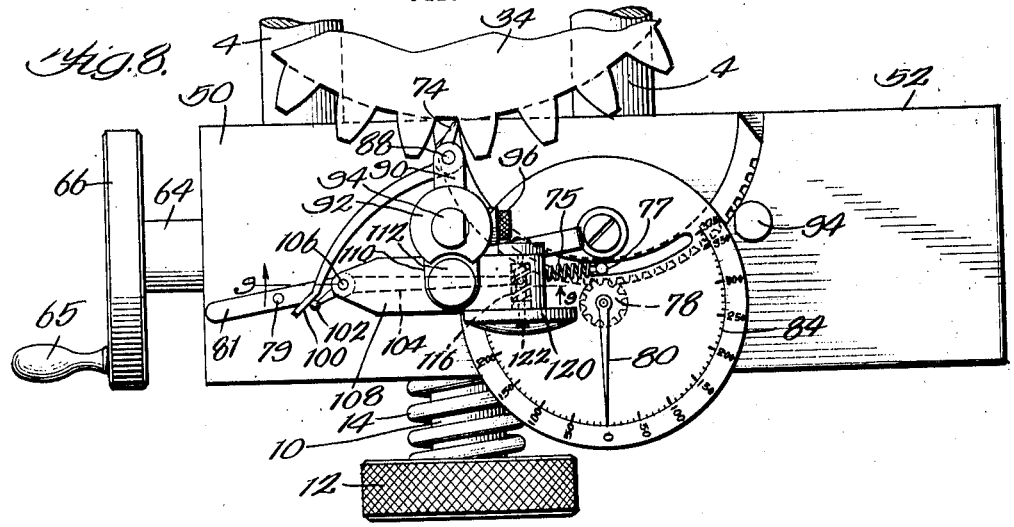
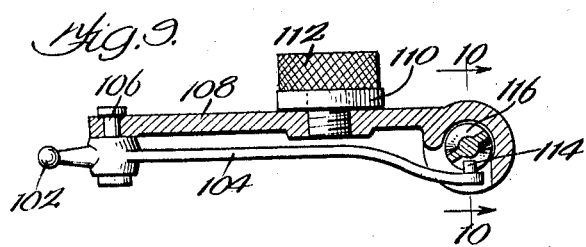
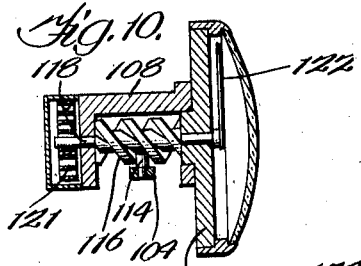
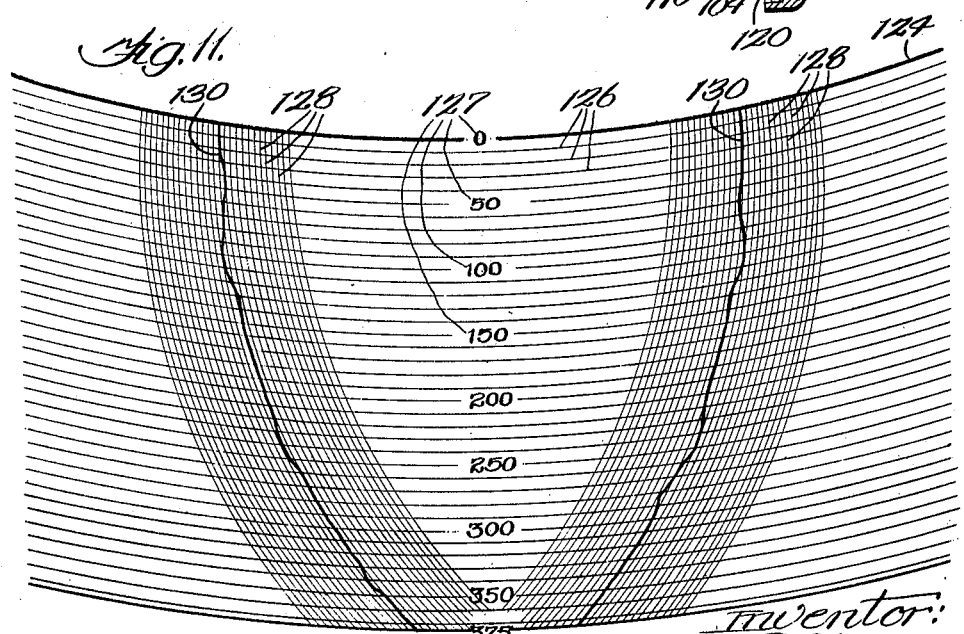
Inventor:
Carl G. Olson
By Cheever & Cox Attys March 1, 1927. 1,619,483
C. G. OLSON
GEAR TESTING MACHINE
Filed March 30, 1922 5 Sheets-Sheet 5

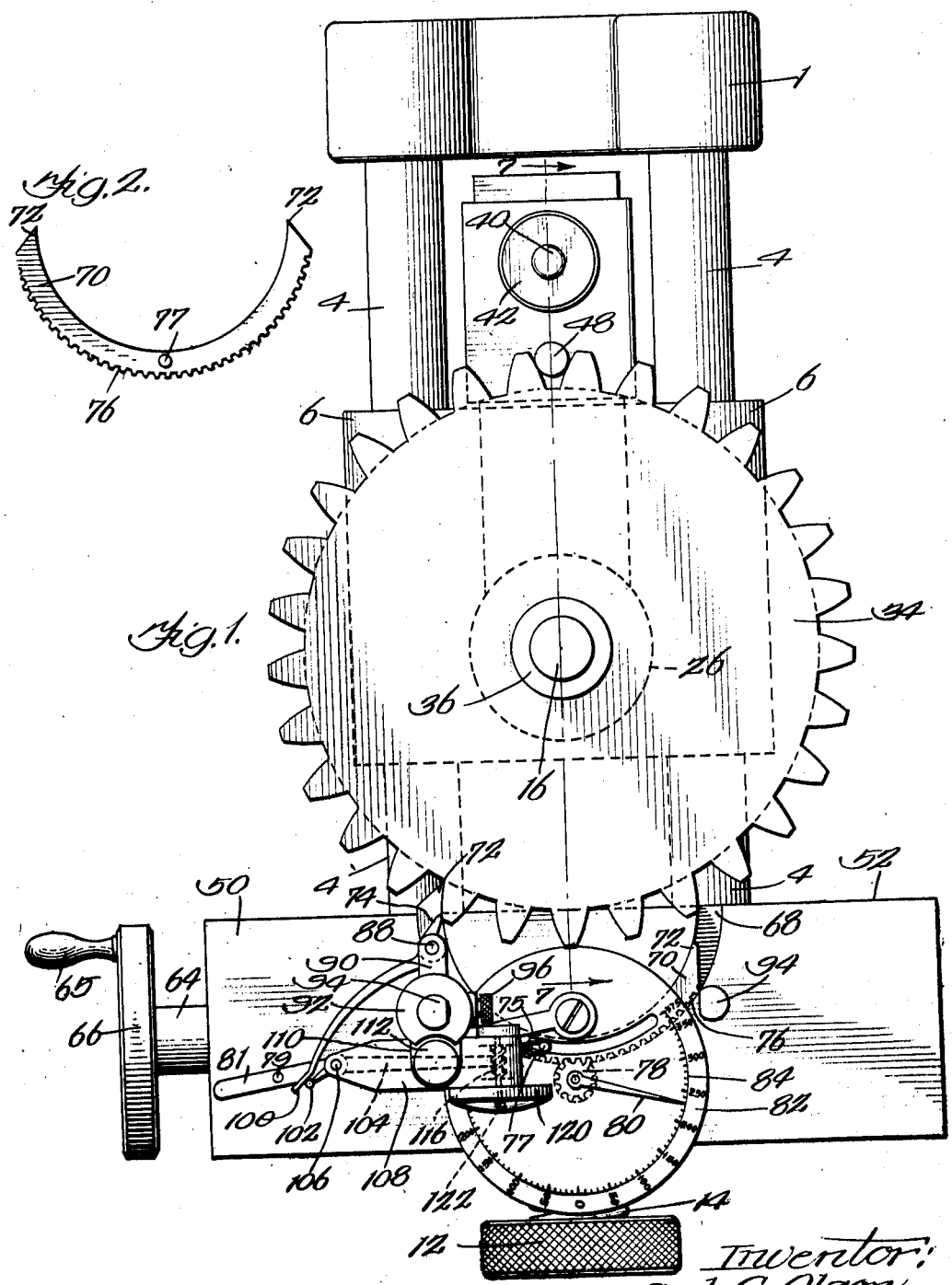

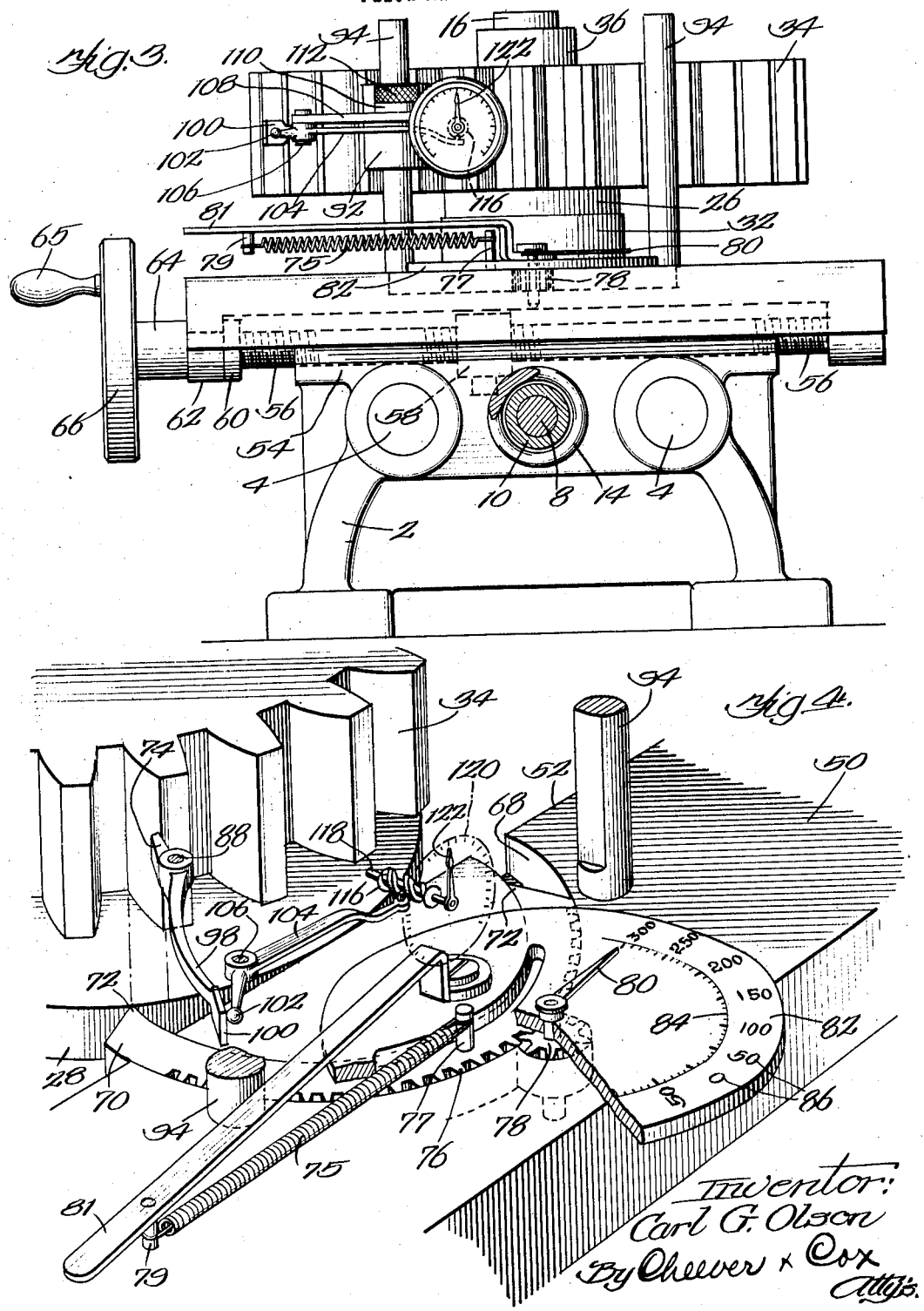

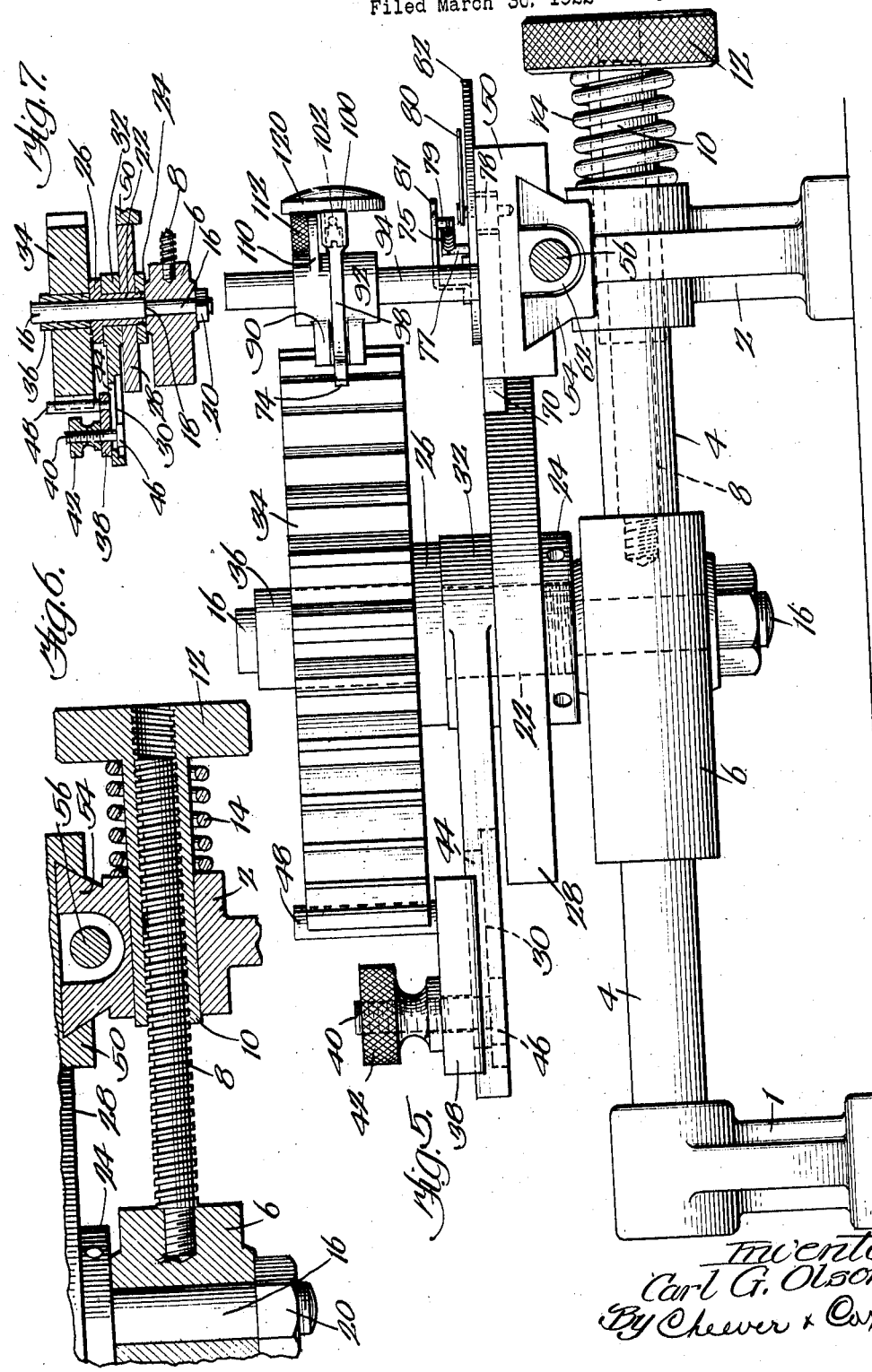

Inventor:
Carl G. Olson
By Cheever & Cox
Attys.

Patented Mar. 1, 1927.

1,619,483

UNITED STATES PATENT OFFICE.

CARL G. OLSON, OF CHICAGO, ILLINOIS, ASSIGNOR TO ILLINOIS TOOL WORKS, OF CHICAGO, ILLINOIS, A CORPORATION OF ILLINOIS.

GEAR-TESTING MACHINE.

Application filed March 30, 1922. Serial No. 547,955.

My invention relates to gear testing machines, more particularly for testing the contour of the teeth of involute gearing. In my prior Patent 1,304,592 issued May 27th, 1919 I have shown a gear testing machine so constructed that when the curve of the tooth being tested is a true involute, in harmony with its base circle, there will be no deflection of the indicator and the contour will thus be proved to be correct, but if any error exists in the curve the amount will be shown by the indicator. But while that machine shows that an error exists and indicates the extent of the error, no means are provided for correlating this with any definite point along the curve—a thing which is necessary to enable the operator to correct the tools by which the gears are formed or dressed. The object of my present invention is to provide means whereby the operator may obtain the factors from which the tooth curve can be plotted; in other words, to provide a machine which will not only indicate the amount of aberration, if any, but also the particular point along the curve (that is, at what depth) where such aberration occurs. My mechanism furnishes means for giving two kinds of factors from which the tooth curve may be plotted or by which it may be mechanically recorded. The tolerance permissible in ordinary gear wheels, such, for example, as are employed in motor vehicles is small, usually being limited to a few ten-thousandths of an inch, and one of my objects is to provide mechanism by which the indicated factors will be magnified so that the accuracy of the profile or tooth contour may be readily judged by the unaided eye. Contributory objects by which these principal objects are obtained will become evident as the description proceeds.

I obtain my objects by the mechanism illustrated in the accompanying drawings in which—

Figure 1 is a plan view of the complete machine.

Figure 2 is a fragmentary detail of the segmental gear which forms the depth gauge.

Figure 3 is a front view of the machine.

Figure 4 is a fragmentary perspective of the two correlated indicators and the mechanism most intimately associated therewith.

Figure 5 is a side elevation looking towards the left in Figure 3 and omitting the hand wheel for better revealing the parts.

Figure 6 is a sectional view of the tension mechanism by which the base cylinder is kept in close contact with the slide table.

Figure 7 is a vertical sectional view on the line 7—7 Figure 1.

Figure 8 is a top plan view showing the parts in changed position from the one shown in Figure 1.

Figure 9 is a detailed view, partly in sections, of the aberration or error indicator. The plane of section is indicated by line 9—9 Figure 8.

Figure 10 is a sectional view of the error indicator taken on the line 10—10 Figure 9.

Figure 11 shows a typical chart or graph which may be plotted from the factors obtainable from the machine.

Like numerals denote like parts throughout the several views.

Figure 12:
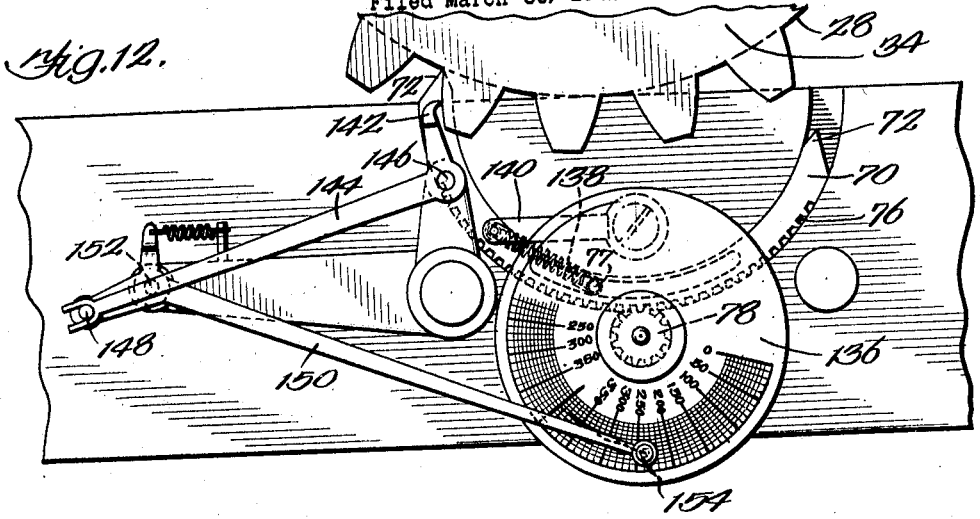
Figure 12 is a modification showing mechanism by which a graphical record may be obtained purely mechanically.

Referring first to the form shown in Figures 1 to 10 inclusive, in which the chart is manually plotted from factors read from pointers or indicators:

The machine has two end frames 1, 2 connected by rods 4, which serve both as part of the frame work and also as guides for the crosshead 6. This crosshead is slidable upon the rods and is controlled by means of the mechanism shown in section in Figure 6. This comprises a screw 8, the inner end whereof is threaded and screws into the crosshead and thus remains permanently attached to it. Surrounding this screw is internally threaded sleeve 10 having a knurled hand wheel 12, by which the sleeve may be rotated. Sleeve 10 is slidably mounted within the frame member 2. Between the frame member 2 and the hand wheel 12 is a helical compression spring 14, which when strained tends to urge sleeve 10, screw 8 and crosshead 6 towards the right, Figures 5 and 6. This keeps the base cylinder in close frictional contact with the working edge 52 of the slide table 50, hereinafter described.

A stud 16 passes upward through crosshead 6 and has a shoulder 18 which bears upon the crosshead. A nut 20 screws onto the lower end of the stud and thus rigidly fastens it to the crosshead. A sleeve 22 fits over the stud above the crosshead and is threaded at the lower end to cooperate with nut 24. At the upper end the sleeve has a flange 26. A base cylinder or roller 28 fits over sleeve 22, and rests upon nut 24. Above said cylinder is an arm 30 having a hub 32, which fits over sleeve 22. The result is that when nut 24 is tightened it clamps the cylinder and the hub of arm 30 rigidly together. The gear 34, to be tested, rests upon flange 26, and if necessary is centered by a bushing 36. Slidingly mounted upon arm 30 is a rider 38. A clamping screw 40 passes vertically through this rider and at the upper end is threaded to take a clamping nut 42. Arm 30 has a longitudinal slot 44, and stud 40 passes down through it and at the lower end has a head 46, which engages the bottom of the arm. The result is that when nut 42 is loosened, the rider 38 may be slid longitudinally of the arm and when it is tightened it will hold the rider securely fastened to the arm. Rising from the inner end of the rider is a pin 48 which may be wedged between the teeth of the gear for preventing it from rotating during the test.

Cooperating with the base cylinder or disc 28 is a sliding table 50, which has a straight working edge 52, which rolls along the edge of the cylinder during the test. This table is slidingly mounted upon guides 54 carried by the frame member 2 as best shown in Figure 6 and at the right of Figure 5. A feed screw 56 screws in a stationary nut 58 carried by the main frame. It has a collar 60 near one end, and is journaled in a flange 62 formed at the end of the table as best shown at the left of Figure 3. The hub 64 of the hand wheel 66 is rigidly fastened to the screw, and the result is that when said wheel is rotated it will rotate the feed screw and cause the slide table to travel upon the main frame. It is this travel of the table which causes the working edge thereof to travel along in contact with the base cylinder and to rotate the latter, and with it the gear to be tested. The frictional engagement between the slide table and the base cylinder is maintained by means of the helical compression spring 14 previously described and best shown in Figures 5 and 6. The parts 50 and 28 may be described as a roller and track respectively, one of which is movable relatively to the other to effect a rolling movement, the roller corresponding to the base circle of the gear and the track corresponding to the base line of the corresponding rack.

An arcuate channel 68 is formed in the table 50 to serve as a guide for the depth gauge 70. This channel conforms to the arc of a circle and according to the present design (which provides for a double acting or reversible depth gauge) the arc is of 180°. The depth gauge lies in the same plane as the base cylinder and has two contact points 72 adapted to engage said cylinder. The diameter of the circle to which the segmental depth gauge corresponds is determined by calculation by the manufacturer of the machine. The proper circle for the depth gauge is one which approximates the involute of the average gear to be tested. To explain, an involute is the curve described by the free end of a string as the same unwinds from the cylinder commonly called the "base cylinder." In the present case the base cylinder 28 forms the analog, and the circle to which the depth gauge 70 conforms is the nearest circle to the average involute of the gears which the machine is designed to test. The involute, of course, does not conform to a circle but within the range of the comparatively limited angular movement of the depth gauge in testing a gear the difference between the true involute and the depth gauge circle will be so slight as to be negligible. Thus it may be said that the depth gauge circle (that is, the circle which passes through the contacting points 72 of the depth gauge) closely approximates an average of the involutes of the gears to be tested.

The depth gauge is kept constantly in close contact with the surface of the base cylinder by means of a tension spring 75, one end of which is fastened to a pin 77, fastened to the top of the depth gauge as shown in perspective Figure 4. The other end of the spring is fastened to a pin 79 secured to the end of a stationary bracket 81. According to the present design said bracket is fastened to the dial 82 hereinafter described.

Gear teeth 76 are formed in the outer surface of the depth gauge 70 to mesh with the teeth of a pinion 78 mounted in the table and adapted to control a pointer 80. Thus the depth gauge may be regarded as a segmental rack adapted to control an indicator. The pointer or indicator 80 cooperates with a dial 82 having graduations 84 and scale figures 86. The zero on this scale corresponds to that position of the depth indicator in which the acting point 72 lies flush with the working edge 52 of the slide table.

A tooth contactor 74 has an acting point adapted to slide along the tooth from bottom to top, or top to bottom—that is, to follow the tooth contour of said contactor— and is pivoted upon a stationary upright pin 88 carried by a bracket 90 projecting from a hub or sleeve 92 which is slidable upon a post 94 rising from table 50. The hub and bracket are held at the proper elevation by means of a set screw 96 best shown in Figures 1 and 8. The table is provided with two of these posts 94, one being employed when one side of the tooth is to be tested and the other when the other side is to be tested. Contactor 74 is in the form of a lever of the first class, having an arm 98 projecting in the opposite direction from the acting point 74 and at its free end having a plate 100 adapted to engage a head 102 formed at one end of a lever 104. Said lever is fulcrumed upon an upright pin 106 as shown in detail in Figure 9. Said pin is mounted upon a bracket 108 fastened to the underside of an arm 110 extending from sleeve 90. Said bracket is secured by means of a screw 112. (See Figures 3, 5 and 9.) At the free end of lever 104 there is a pin 114 which engages the threads of a worm 116 shown in detail in Figures 9 and 10. The helix angle of this worm is relatively large and hence the lateral movement of the lever is readily transformed into a rotary movement of the worm. The worm is secured upon a shaft 118 journaled in bracket 108 and dial 120. A coiled spring 121, shown at the left of Figure 10, constantly holds one side of the worm helix in contact with pin 114 and urges the pin in a direction to hold the head 102 in close contact with plate 100 and urge lever 98 in a direction to maintain contactor 74 in close contact with the tooth being tested. A pointer 122 is fastened to the shaft and rotates with it in front of said dial. The parts are so designed that if the portion of the tooth engaged by the contactor 74 lies in the true involute curve corresponding to the correct base circle, the pointer will stand at zero on the dial. Any deviation from the true involute curve will cause the pointer to be deflected towards the right or left, as the case may be. It will also be evident that when the tooth curve is true, the acting point of the contactor 74 will be held by the teeth in the plane of the working edge of the table. This may be regarded as the normal position of the contactor and when it is in this position the pointer of the contour indicator will stand at zero. Thus in normal or starting position the line of tangency of the base cylinder with the working edge of the slide table will, if produced upward, pass through the point of the tooth contactor 74 and the acting point 72 of the depth gauge will also coincide with said line.

In operation, the operator first brings the parts to the position shown in Figure 8— that is, with the working edge 52 of the slide table 50 tangent to the base cylinder 28 at the point of intersection of the depth gauge circle with said working edge. This is the point where the contacting edge 72 of the depth gauge 70 comes when flush with said working edge. This will bring the pointer 80 of the depth indicator to zero. It will also bring the gear to be tested into such position that the contactor 74 of the contour indicator will engage the side of the tooth substantially at the bottom, and the pointer 122 of the contour indicator will be opposite the zero point on the dial 120. When the setup has thus been made the operator grasps the handle 65 of the hand wheel 66 and rotates the feed screw 56 in a direction to cause the table or carriage 50 to move towards the left so that the parts will finally assume the position shown in Figures 1 and 4. As the table thus travels towards the left and its straight edge "rolls along the base cylinder" so to speak, the tooth contactor 74 will glide along the curved involute surface of the tooth towards the top thereof and the point on the base cylinder engaged by the depth gauge will simultaneously recede from the working edge 52. The tension spring 75 (shown in perspective in Figure 4), acting upon the depth gauge keeps the contact point 72 in constant engagement with the base cylinder with the result that point 72 moves outward and causes the pointer 80 of the depth indicator to rotate. If during the gliding of the contactor 74 along the curve of the tooth the tooth contour is correct, the indicator pointer 122 will remain stationary; otherwise it will deviate and indicate the error on a magnified scale. It will thus be evident that while this movement of the slide table, just described, takes place the contour indicator will show whether the contour is correct at the engaged portion of the tooth, while the depth indicator will show exactly what point of the tooth is being engaged. Thus two factors are given;
(a) the aberration, if any, and
(b) the depth at which such an aberration, if any, is located.

These two factors enable the operator to plot a curve which will give a correct portrayal of the contour of the tooth from top to bottom. Such portrayal is usually in the form of a graph or chart, a typical illustration of which is shown in Figure 11 of the drawings. In this case the record sheet 124 is arcuate to correspond to the diameter of the gear being tested. It is provided with a number of concentric lines 126 corresponding to different depths of the tooth. They are identified by numbers 127 which correspond to the scale numbers 86 on the depth indicator dial 82. The record sheet is also ruled with a number of parallel involutes 128 which represent correct involute curves. In making the graph the operator will start, for example, at the zero line or inner edge of the record sheet which corresponds to the bottom of the tooth. He selects any one of the involute lines 128 and marks the point of intersection of this involute curve with the zero line. He then, as the table moves toward the left, makes succeeding marks on the circular depth lines and if the contour indicator deviates from zero, places the mark to the right or left of the contour line (involute curve ruling) on sheet. This process is continued until the contactor 74 reaches the top of the tooth whereupon the operator, by passing a line 130 through the various marks which he has made, reproduces on a magnified scale the contour of the tooth. In this way he will produce an accurate and enlarged record of the tooth contour and will be enabled to definitely locate the tooth where the errors of contour (if any) occurred, and to what extent they occurred. This gives him definite data with which to work in correcting the gear.

I have illustrated the machine as testing the left side of a tooth—that is, the side toward the left when viewed as in the drawings. When it is desired to test the opposite side of a tooth the operator loosens the screw 96 and slides the sleeve 92 up off of the post 94 on which it has been supported. He then turns said sleeve and parts supported thereby upside down and then lowers the sleeve onto the post 94 at the opposite side of the channel 68. He also changes the position of arm 81 to extend at an equal angle in the opposite direction (towards the right). This reverses all the acting parts and the operator proceeds upon the same principle as before.

Figure 13:
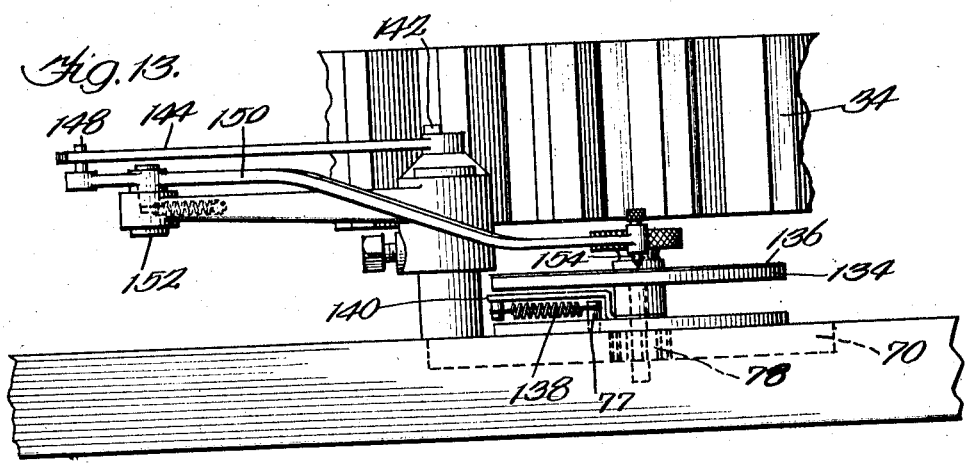
Figure 13 is a front elevation of the parts shown in Figure 12.
Figure 14:
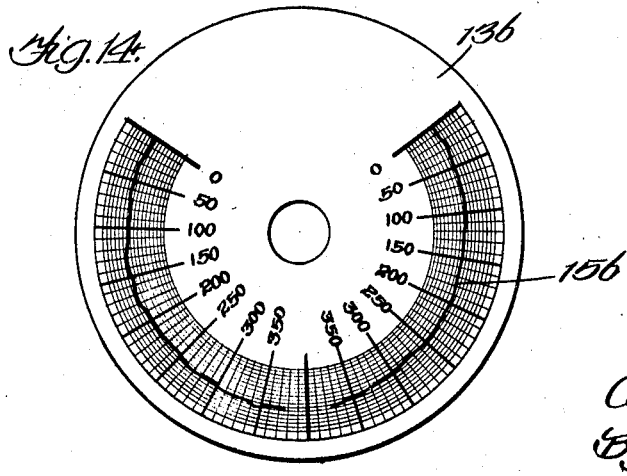
Figure 14 shows a typical graph or record produced by the mechanism shown in Figures 11 and 12.

In Figures 12, 13 and 14 of the drawings I have shown a machine embodying the same principle but having the added characteristic that it is self recording, the graph being made automatically. In the form illustrated in these figures the indicators 80 and 122 are omitted and instead a disc 134 is provided which is adapted to support the record sheet 136 shown separately in Figure 14. Said disc is rotatably mounted and is secured to the pinion 78 with the result that it moves in harmony with the depth gauge 70. In this particular design said depth gauge is kept in contact with the base cylinder 28 by a spring 138 which is similar in function to the spring 75 and is anchored to the stationary arm 140, the other end being fastened to the depth gauge as before. In this case the tooth contactor 142 which corresponds to the contactor 74 operates a lever 144, which is fulcrumed upon a stationary pin 146 and engages a pin 148 fastened at one end of a lever 140. Said lever 150 is fulcrumed upon a stationary pin 152 and at its opposite end carries a stylus 154 adapted to trace a curve upon the record sheet 136.

From the foregoing it will be evident that as the table travels the record sheet will be rotated through the agency of the depth gauge and pinion 78, and at the same time the stylus 154 will remain stationary if the tooth contour is correct, but will be moved to one side or the other if the contour varies from a true involute; thus a line 156 will be traced by the stylus and this will be a true circle if the contour is correct, but will depart from a true circle if it is incorrect. This graph may be interpreted in a similar manner as before.

It will be understood that I employ the terms "depth" or "position" to indicate the location along the tooth curve or involute and the term "contour" to indicate the distance, if any, from the true involute to which the tooth curve should conform.

Having thus described my invention, what I claim is new and desire to secure by Letters Patent is:

1. A gear testing machine having a base cylinder having a diameter equal to the diameter of the base circle of the gear to be tested, a table having a straight working edge, means for causing relative movement between the base cylinder and the table whereby there is a rolling action between them, means for holding the gear to be tested concentric with and fast to the base cylinder, a contactor adapted to engage a tooth of the gear to be tested, a contour indicator actuated by said contactor, and means for indicating the position along the tooth curve where said contactor engages the tooth.

2. A gear testing machine having a gear support, a contour indicator and an indicator support, the gear support having a base cylinder corresponding to the base circle of the gear and the indicator support having a straight working surface tangent to the base cylinder, said supports being relatively movable to effect a relative rolling movement between the base cylinder and the indicator support, the indicator having a tooth contactor for actuating it, the tooth contacting portion of said contactor normally lying in an extension of the plane of said working surface, a depth gauge, and means for actuating said depth gauge in proportion to the receding of the base cylinder at the point contacted by the contactor, to thereby indicate the position of the contactor along the tooth curve.

3. A gear testing machine having a base cylinder whose diameter is equal to the diameter of the base circle of the gear to be tested, a slide table having a straight working edge adapted to frictionally engage the base cylinder, means for causing the table to travel lengthwise and thereby rotate the base cylinder, means for holding the gear to be tested concentric with and fast to the base cylinder, a tooth contactor pivotally mounted on said table and adapted to engage the face of the tooth to be tested and to slide along the curve as the table travels and the gear rotates, a contour indicator actuated by said contactor, and a depth gauge for indicating the position along the tooth curve where said contactor is in engagement.

4. A gear testing machine having a contour indicator provided with a contactor adapted to engage the acting surface of a gear tooth and to glide along said curve for indicating the aberration thereof, if any, a base cylinder adapted to be fastened to the gear to be tested and having a diameter equal to the base circle of said gear, a work table having a straight edge adapted to make frictional contact with said cylinder, means for causing said table to travel lengthwise of said working edge, a segmental depth gauge having an acting point adapted to maintain engagement with the base cylinder at a given point thereon, means for guiding said depth gauge along a curve approximating the involute of the tooth to be tested, and means actuated by said depth gauge for indicating the amount of travel of said gauge.

5. A gear testing machine having a contour indicator provided with a contactor adapted to engage the acting surface of a gear tooth and to glide along said curve for indicating the aberration thereof, if any, a base cylinder adapted to be fastened to the gear to be tested and having a diameter equal to the base circle of said gear, a work table having a straight edge adapted to make frictional contact with said cylinder, means for causing said table to travel lengthwise of said working edge, a segmental depth gauge having an acting point adapted to maintain engagement with the base cylinder at a given point thereon, said table having a circular channel for guiding said depth gauge along a circle approximating the involute of the tooth to be tested, and an indicator geared to said depth gauge for indicating the amount of travel of said gauge.

6. A gear tester having a rotatable cylinder with a fixed center adapted to hold the gear to be tested, a table having a straight edge movable tangentially of said cylinder, a tooth contactor whose acting point is normally in line with the line of tangency of the cylinder and straight edge, means on said table for pivotally supporting said contactor, and indicator controlled by said tooth contactor and a depth gauge on said table for indicating the position of the contactor along the tooth curve.

7. A gear tester having a base cylinder rotatable in a horizontal plane and adapted to support the gear to be tested, a table having a straight edge, adapted to travel in a horizontal plane tangentially to said cylinder, means for yieldingly keeping said cylinder and table in contact with each other, a tooth contactor whose acting point is normally in line with the line of tangency of the cylinder and straight edge, said contactor being movably mounted on said table, a contour indicator controlled by said contactor and a depth gauge on said table for indicating the position of the contactor along the tooth curve.

8. A gear tester having a rotatable base cylinder with a fixed center adapted to hold the gear to be tested, a table provided with a straight edge and being movable tangentially to said cylinder, a tooth contactor, a lever pivotally supported on said table for supporting said contactor, an indicator controlled by said lever, a spring for constantly urging said tooth contactor toward the tooth to thereby maintain it in contact with it and a depth gauge on said table for indicating the position of the contactor along the tooth curve.

9. A gear tester having a base cylinder rotatable in a horizontal plane about a fixed center and adapted to support the gear to be tested, a table having a straight edge and being adapted to travel in a horizontal plane in a straight line, means for maintaining the cylinder and table tangential to each other, a tooth contactor whose acting point is normally in line with the line of tangency of the cylinder and straight edge, means on the table for pivotally supporting the tooth contactor, a multiplying lever actuated by said contactor, a contour indicator controlled by said lever and means for moving the table to cause rotation of the base cylinder.

10. A gear tester having a base cylinder, a longitudinally movable table having a straight edge maintaining tangency with said cylinder, a tooth contactor, an indicator controlled by said tooth contactor, two posts mounted upon the table and arranged symmetrically on opposite sides of a plane passing through the axis of the base cylinder at right angles to the straight edge, and a hub for supporting the contactor and indicator, said hub being adapted to fit over either of said posts, either end upward, whereby the contactor and indicator are reversibly mounted on said table and opposite sides of a tooth may be tested, and means for moving the table to cause rotation of the base cylinder.

11. A gear tester having a base cylinder, a longitudinally movable table, having a straight edge maintaining tangency with said cylinder, a tooth contactor, an indicator controlled by said tooth contactor, means for securing said contactor and indicator upon said table with either side uppermost, thereby rendering the same reversible and enabling the contactor to engage either side of the tooth to be tested and means for moving the table to cause rotation of the base cylinder.

12. A gear tester having a base cylinder, a longitudinally movable table having a straight edge maintaining tangency with said cylinder, a tooth contactor, an indicator controlled by said tooth contactor, a sleeve for supporting said contactor and indicator, two posts on the table adapted to support the sleeve, the sleeve being reversible end for end on the posts, whereby the contactor may be caused to engage opposite sides of a tooth and means for moving the table to cause rotation of the base cylinder.

13. A gear tester having a base cylinder, a longitudinally movable table having a straight edge maintaining tangency with said cylinder, a tooth contactor, an indicator controlled by said tooth contactor, two posts mounted on the table and arranged symmetrically with respect to a plane passing through the axis of the cylinder at right angles to the straight edge, a hub for supporting the contactor and indicator, said hub being adapted to fit over either of said posts, either end upward, means for longitudinally moving the table to cause rotation of the base cylinder, and means for indicating the position of the contactor along the tooth curve.

14. A gear tester having a rotatable cylinder with a fixed center adapted to hold the gear to be tested, a table having a straight edge movable tangentially of said cylinder, means for moving said table for causing rotation of said cylinder, a tooth contactor, means on said table for pivotally supporting said contactor, an indicator controlled by said tooth contactor, and a depth gauge for indicating the position of the tooth contactor along the tooth curve.

15. A gear tester having a rotatable cylinder with a fixed center adapted to hold the gear to be tested, a table having a straight edge movable tangentially of said cylinder, means for moving said table to cause the rotation of said cylinder, a tooth contactor, means on said table for pivotally supporting said contactor, an indicator controlled by said tooth contactor, a depth gauge movable upon said table in the direction approximating the average involute of the teeth of the gears to be tested, means for maintaining said depth gauge in contact with the base cylinder, and an indicator controlled by said depth gauge.

16. A gear tester having a rotatable base cylinder, a table having a straight edge adapted to travel tangentially to said cylinder, means for moving said base cylinder and table relatively to each other, tangentially, to cause rotation of said cylinder, a contour indicator adapted to indicate the contour of the tooth to be tested, said contour indicator having a tooth contactor adapted to slide along the tooth curve, and a depth gauge adapted to indicate the position of the contactor along the tooth curve, said contactor and depth gauge being reversible upon the table for testing opposite sides of any tooth.

17. A gear testing mechanism comprising a cylindrical bearing, a member in rolling contact with said bearing, means for maintaining said contact, means for supporting a gear to be tested coaxially with the cylindrical bearing, a contact device mounted upon and movable with said member in contact with a tooth of the gear and having an independent movement caused by imperfections in said tooth, means for indicating the amount of movement of said device from a normal position, and means for showing the amount of rolling which has occurred between the two first mentioned elements.

In witness whereof, I have hereunto subscribed my name.

CARL G. OLSON.